No. 629,757. Patented July 25, 1899.
J. CHRISTENSEN.
DEVICE FOR CORRECTING COMPASS ERRORS.
(Application filed July 15, 1898.)
(No Model.)

Witnesses,

Inventor,
Jorgen Christensen
By Dewey Strong & Co.
atty

UNITED STATES PATENT OFFICE.

JORGEN CHRISTENSEN, OF SAN FRANCISCO, CALIFORNIA.

DEVICE FOR CORRECTING COMPASS ERRORS.

SPECIFICATION forming part of Letters Patent No. 629,757, dated July 25, 1899.

Application filed July 15, 1898. Serial No. 685,984. (No model.)

*To all whom it may concern:*

Be it known that I, JORGEN CHRISTENSEN, a citizen of the United States, residing in the city and county of San Francisco, State of California, have invented an Improvement in Devices for Correcting Compass Errors; and I hereby declare the following to be a full, clear, and exact description of the same.

My invention relates to an apparatus which is designed for the correction of compass errors, and especially for such errors of deviation as may arise either by reason of masses of iron forming a part of the vessel or its cargo or from other sources which will cause different deviations upon different courses upon which the vessel may be sailing; also, for obtaining accurate bearings of or from any celestial body or terrestrial object by the aid of a mirror or prismatic reflection, thereby determining the exact position of the ship.

My present invention consists in the parts and the construction, arrangements, and combinations of parts hereinafter described and claimed.

Figure 1:
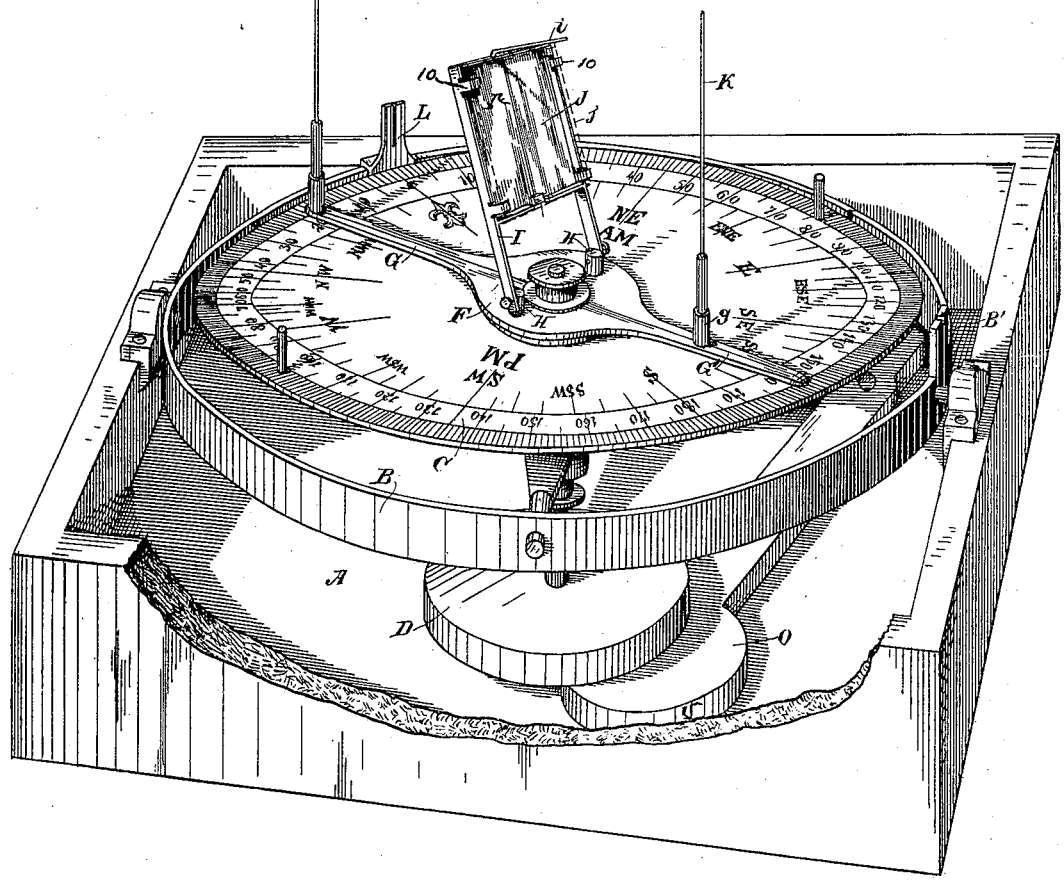
Figure 2:
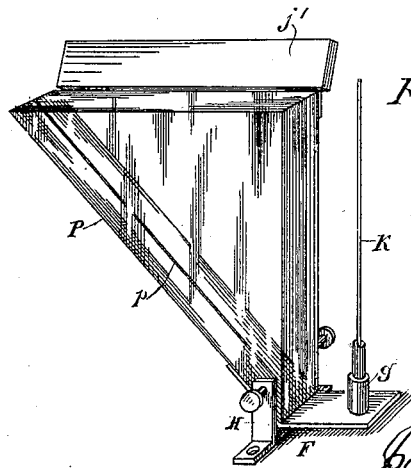

Referring to the accompanying drawings, Figure 1 is a perspective view of the device. Fig. 2 shows a prism in place of a mirror.

A is the compass bowl or box, having the ring B journaled therein, said ring being provided with a mark or standard B' exactly in line with the ship's head.

The compass card or plate C is journaled in the ring at right angles with the journals of the ring, and the counterbalance-weight D is fixed upon a vertically-depending stem extending downward from the center of the axis upon which the compass-card is mounted, so that the compass-card will be maintained approximately level whatever may be the motions of the ship.

The compass-card is centrally pivoted, so as to turn about this pivot-pin to adjust it to any desired position, and above the card is a disk F, having arms G and G', extending radially in opposite directions to a point near the periphery of the card, so as to stand above the subdivisions marked upon the periphery of the card and indicate the adjustment of the arms with relation to the card.

Carried by the disk F or its arms are low standards H, to which are pivoted the lower ends of supports I, upon which the mirror J or an equivalent reflecting-prism P is carried. These supports stand at right angles with the arms G G', and the mirror or prism is adjusted so that a line $p$ made in its reflecting-surface will lie in the vertical plane of the lines which are made centrally upon the top of the arms G G'. I have also shown a slender rod or wire $i$, projecting from the upper part of the reflector and standing in the same plane, to increase the accuracy of the observations.

The mirror is provided with guides 10, so that when the sun is excessively bright a colored glass $j$ may be slipped into these guides and cover the surface, so as to veil its brightness, while allowing the reflection to be seen through it. In Fig. 2 the colored glass $j'$ is shown as hinged along the upper edge of the prism.

Upon the arm G, which is in front of the mirror, is a socket $g$, and this socket is adapted to receive a shadow-pin K, which may be fitted into it so as to stand vertically above the line upon the arm and exactly in line with the mark made in the center of the mirror or prism.

The compass-card is graduated in each direction from zero at the north to one hundred and eighty degrees at the south. When it is desired to make a correction for any particular course upon which the vessel may be sailing, the azimuth for the particular locality is ascertained from the usual azimuth-tables, and it is measured from the north to either east or west, as the position requires, if in north latitude. If in south latitude, the azimuth is substracted from one hundred and eighty degrees and the remainder is set off from the north. If the vessel's course should be, for instance, southeast, the card C is set with "S. E." in line with the ship's head, and the clamp L may be fixed to the ring B in line with "N." on the card. The disk F is turned so that the arms G G' stand in line with the degree indicated by the azimuth-table, and an observation is then taken by means of the mirror or prism and the shadow-pin. If the image appearing in the mirror is properly bisected by the line upon the mirror and the corresponding shadow formed by the pin standing in front of the mirror, the compass will show no deviation; but if there is a deviation the compass plate or card is turned until the sun is bisected by the line in the mirror and throws the corresponding shadow of the shadow-pin. The deviation indicated by the movement of the compass-card is then noted, and the course will be changed to the right or left of the indicated course to an equal amount. In order to accurately indicate this deviation, I have shown a clamp L, which fits upon the rim B just exterior to the compass-card, this clamp having a vertical line in the center. This clamp is set at the zero or north point of the card before the deviation is determined, and when the compass-card has been turned, as previously described, to bring the shadow in the proper position the amount of deviation will be noted by the distance between the zero-point and this indicator L, so that the observer will make no mistake in changing his course the same number of degrees and minutes as the difference between the zero and this indicator.

It often occurs that the sun is so much obscured by clouds, fog, or haze that a clear definition of it is not possible, and it will fail to cause a sufficient shadow by the aid of the pin alone for the desired purpose; but when the pin and the mirror are used together the two will correct each other and the image of the pin can be brought absolutely in line with the mark upon the mirror and the center of the sun's image, thus lessening the danger of errors of this kind.

The construction herein shown greatly simplifies the apparatus and makes it practical and available for observers of the most ordinary intelligence.

Accurate bearings of or from any celestial body or terrestrial object may be obtained by the use of this instrument, and the exact position of the ship can be ascertained and any errors of the compass corrected.

In Fig. 1 I illustrate a forked sight S, carried by the arm G, and which is designed for use in obtaining bearings, as follows: Set the compass-plate to ship's head, turn the pointer in the direction of the object, and look through the forked sight S and turn the pointer until the shadow-pin bears in line with the middle prong of the sight and the object. This will give the exact compass-bearing on that particular course the navigator was steering at the time; but to get the magnetic bearing for use with the chart the pointer must now be turned an equal amount of points or degrees right or left, according to the error of the compass east or west on the course the ship was heading at the time.

When swinging a ship in a harbor or quiet water to adjust the compass, it is preferable to temporarily steady the suspended parts to prevent their being tilted by handling. This is effected by a stop O, of any suitable construction, adapted to interlock with or steady the swinging weight. It may be a disk mounted upon a lever-arm and turnable beneath the weight, or a pin adapted to enter a hole in the weight, or a clamp or any equivalent holding device which will prevent the parts from being unsteady.

Having thus described my invention, what I claim as new, and desire to secure by Letters Patent, is—

1. In an apparatus for correcting compass errors and obtaining bearing, the combination with a compass-card and a bowl within which it is suspended, of a disk centrally pivoted and turnable independently of the card, said disk having radial arms projecting in opposite directions and said arms having central radial lines marked thereon, a light-deflecting surface carried by the disk and having a vertical bisecting line, and a shadow-pin in front of and coincident with said bisecting line.

2. In an apparatus for correcting compass errors and obtaining bearings, a counterbalanced suspended compass-card turnable upon a central point, a surrounding ring within which it is suspended, said ring being also suspended in a compass-bowl and having an indicator in line with the ship's head, a central disk pivoted upon the compass-plate and turnable independently thereof, arms projecting radially in opposite directions from the disk having central radial lines, a light-deflector pivoted at right angles with said arms and turnable about its pivots, a vertical bisecting line marked upon the deflector to coincide with the lines upon the arms and a shadow-pin set vertically upon the arm in front of the deflector and coincident with the bisecting line thereof.

3. In an apparatus for correcting compass errors and obtaining bearings, a counterbalanced universally-journaled compass-card with peripheral markings, a ring surrounding the periphery, with an index-line in the direction of the ship's head, a disk centrally pivoted on the compass-card and independently turnable with relation thereto and having arms extending in opposite directions to the periphery of the disk, said arms having radial lines marked upon them, a socket fixed upon the line of one of the arms and a shadow-pin removably insertible in said socket, a light-deflector, the support of which is journaled across the disk and at right angles with the lines upon the arms, said deflector having a vertical bisecting line as shown, and a removable indicator adapted to clasp the ring surrounding the compass-card to show the deviation when the card is turned with relation to the ring.

4. In an apparatus of the character described, the combination of a compass-card, a bowl within which it is suspended, a disk pivoted to turn about the axis of the card, arms radiating from the disk in opposite directions and having lines centrally marked thereon, a light-deflecting surface carried by the disk and having a bisecting line, a shadow-pin carried by one of said arms, and a forked sight carried by the other arm and having a central prong to be alined with the shadow-pin and object.

In witness whereof I have hereunto set my hand.

JORGEN CHRISTENSEN.

Witnesses:
S. H. NOURSE,
H. F. ASCHECK.